United States Patent [19]
Perlman et al.

[11] Patent Number: 5,826,931
[45] Date of Patent: Oct. 27, 1998

[54] TRUCK BODY

[75] Inventors: Dan Perlman, Auburn; Richard Gordon, Shillington; Jack O'Donnell, Lancaster; William Rahn, Reading; Lynn Gordon; Jim DeTemple, both of Schillington, all of Pa.

[73] Assignee: Reading Body Works, Inc., Shillington, Pa.

[21] Appl. No.: 803,268

[22] Filed: Feb. 20, 1997

Related U.S. Application Data

[62] Division of Ser. No. 688,505, Jul. 30, 1996.

[51] Int. Cl.$^6$ .................................................... B62D 33/03
[52] U.S. Cl. .......................................... 296/37.6; 296/57.1
[58] Field of Search ................................... 296/37.6, 57.1

[56] References Cited

U.S. PATENT DOCUMENTS

| | | |
|---|---|---|
| 2,124,776 | 7/1938 | Hawkins . |
| 3,245,713 | 4/1966 | Ogilvie . |
| 3,386,765 | 6/1968 | Drach, Jr. . |
| 4,029,355 | 6/1977 | Wilhelmsen ............................ 296/57.1 |
| 4,126,349 | 11/1978 | Nelson et al. ......................... 296/37.6 |
| 4,135,761 | 1/1979 | Ward ...................................... 296/37.6 |
| 4,685,695 | 8/1987 | LeVee .................................... 296/37.6 |
| 5,192,108 | 3/1993 | Richardson et al. . |
| 5,267,773 | 12/1993 | Kalis et al. ............................. 296/37.6 |
| 5,368,357 | 11/1994 | Kalis, Jr. et al. . |
| 5,584,144 | 12/1996 | Hisano . |

*Primary Examiner*—Gary C. Hoge
*Attorney, Agent, or Firm*—Robert A. Koons, Jr.

[57] ABSTRACT

A truck body has two enclosures having inner walls with upper and lower sections. The horizontal distance between opposite portions of the upper sections is less than the horizontal distance between opposite portions of the lower sections. A tailgate is latchable to the lower sections of the inner walls. A truck body has compartments having smoothly curving doors having an outer section and an inner section having a generally vertical inner surface. Generally vertical surfaces are provided on opposite sides of the inner surface for mounting of latch hardware, and, above and below each such vertical surface, a surface adapted for mounting of a hinge. A truck body has compartments, each of which has a front wall with an opening. The opening has smoothly curving edges and an outward-projecting upstanding flange about its perimeter. A truck body has a compartment door mounted to rotate about a horizontal axis, which door has an inner surface including a planar portion having an upstanding circumferential lip.

3 Claims, 5 Drawing Sheets

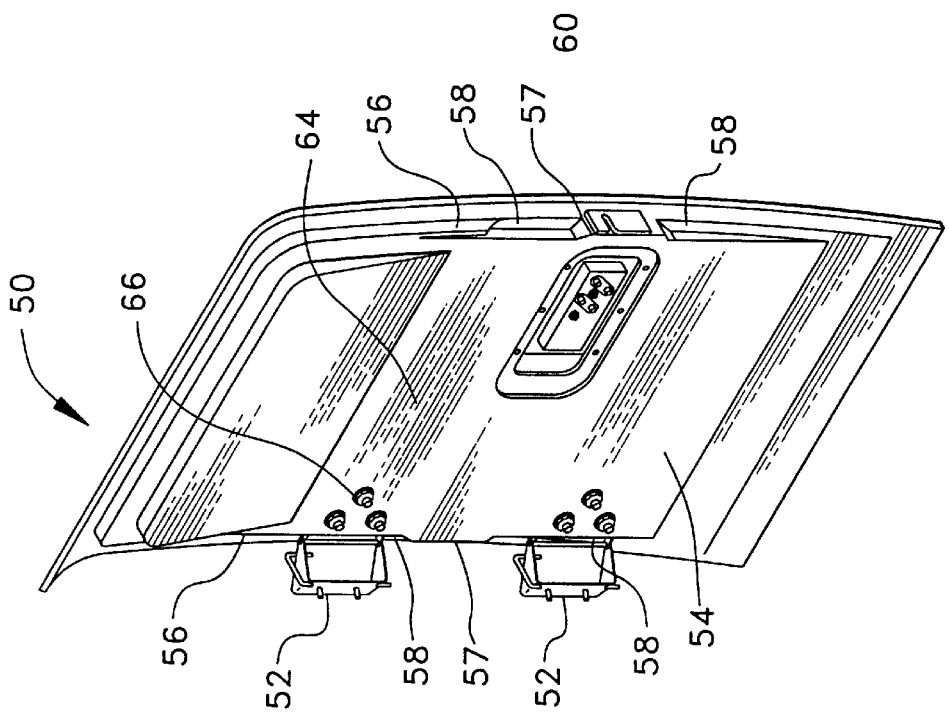
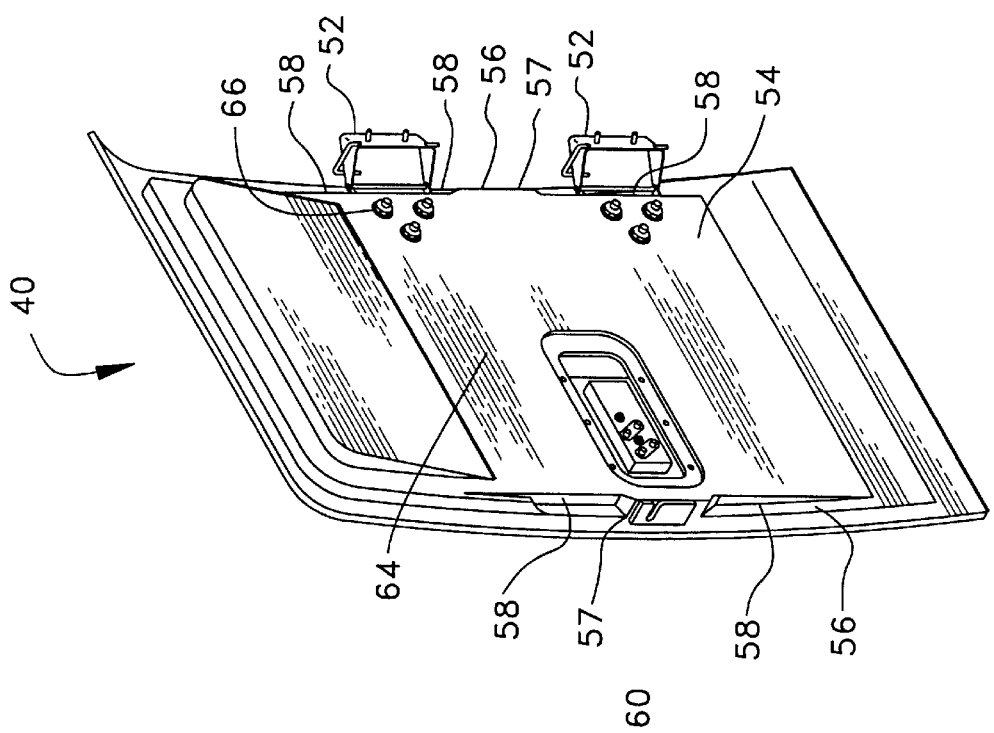

TRUCK BODY

This is a divisional of copending application Ser. No. 08/688,505 filed on Jul. 30, 1996.

BACKGROUND AND FIELD OF THE INVENTION

This invention relates to vehicles and particularly to truck bodies.

Truck bodies conventionally are made from sheet metal which has been cut and formed into appropriate shapes and then welded or fastened together. A truck body conventionally has two large upstanding enclosures along the sides of the truck body. A cargo bed is usually provided in an open space between the enclosures. A removable tailgate provides a rear closure to the cargo bed. Cargo is carried in the cargo, and is loaded in and out of the cargo bed by either rotating the tailgate downward or temporarily removing the tailgate completely.

The large enclosures are divided into several compartments. In a typical design, three compartments are provided. One nearest the front has a door with vertically disposed hinges. A center compartment is located over the wheel of the truck. The door of such a compartment generally has horizontally disposed hinges along the bottom thereof. Chains or cables are provide so that the door does not drop open and damage the panel of the door and the outer panel of the truck body.

The inventors have identified a number of disadvantages and difficulties associated with existing truck bodies. In existing truck bodies using slam action hardware, when cargo is being removed from or loaded into the cargo area in the interior of the truck body, the hardware that secures the tailgate to the interior surfaces of the truck body is frequently contacted by the cargo. As a result, the latch hardware becomes damaged, and the cargo may be dented or scratched.

As noted above, truck bodies are conventionally manufactured from sheet metal. It is difficult to form sheet metal into curves that will retain their shape in the conventional use of a truck body. As a result, the side panels of truck bodies are generally planar and vertical. Die formed body panels would be an alternative, that would hold a curved shape in use. However, the manufacture of a die is quite expensive. Numerous individual dies must be prepared for the various parts of a truck body. These parts ordinarily include inner and outer panels for each of the six cargo doors on a conventional truck body design. The need for numerous dies contributes significantly to the cost of manufacture of truck bodies using molded parts.

The vertically-hinged doors in conventional truck bodies swing open readily. When the user has the door open, the door is prone to move and strike the user as a result of gusts of wind.

Truck bodies are subject to enormous stresses and strains when driven on poorly maintained roads, dirt roads, and in off-road conditions. As the work site is often in a location without convenient paved roads, such use of truck bodies is the norm. One of the principal areas where cracking commences as a result of these stresses and strains is in the joints between panels in the interior of the individual compartments. The corners where pieces are held together are subject to particularly great stresses and strains when the truck rides on rough terrain.

Users of truck bodies frequently find themselves in need of a convenient work surface. Sometimes, they use the interior surface of the center door as a work surface. However, when a truck is parked on non-level ground surfaces, that tools and particularly small items, such as nails and screws will readily slide or roll off onto the ground.

OBJECTS AND ADVANTAGES OF THE INVENTION

It is an object of the invention to provide a truck body in which damage to tailgate hardware and cargo when loading and unloading the cargo area is minimized. It is an object of the present invention to provide a door panel configuration which minimizes the number of individual molds necessary to manufacture a molded truck body. It is an object of this invention to provide a truck body having hinges in vertical doors which can readily stay open. It is an object of the present invention to provide a truck body in which stress and strain on interior joints is minimized. It is an object of the present invention to provide a truck body having an integrated convenient work surface.

Additional objects and advantages of the invention will become apparent from the detailed description of a preferred embodiment which follows.

SUMMARY OF THE INVENTION

A truck body according to the invention has enclosures on each of its sides, each of which enclosures has an inner wall, a forward wall, and a rear wall, a central forward wall joining the forward walls of each enclosure, a central cargo area intermediate the inner walls and the central forward wall, having a horizontal cargo bed, and a tailgate at the rear of the cargo area. The tailgate is generally rectangular and upright in a closed position, is rotatably mounted on each side thereof near the bottom thereof to the inner walls, and is detachably latchable near the top thereof to said inner walls. The inner walls have upper and lower sections, the horizontal distance between opposite portions of the upper sections being less than the horizontal distance between opposite portions of said lower sections. The tailgate is latchable to the lower sections of the inner walls.

A truck body according to the invention has one or more compartments, each of which compartments has smoothly curving doors. The doors include an outer section and an inner section, which inner door section has a generally vertical inner surface. There are defined on opposite sides of the inner surface generally vertical surfaces which are generally orthogonal to the inner surface. The generally vertical surfaces are adapted for mounting of latch hardware. There is provided above and below each of the latch hardware mounting surfaces a surface adapted for mounting of a hinge.

A truck body according to the invention has one or more compartments defined by a substantially planar floor having an inner edge, an outer edge, and two opposite side edges, a substantially planar rear wall joined at a lower edge thereof to the inner edge of the floor, substantially planar upright side walls joined at a lower edge thereof to the side edges of said floor and at an inner edge thereof to the rear wall, and a generally horizontal upper surface joined to the side walls and the rear wall, a front wall being joined to the floor, the side walls and the upper surface, the front wall having an opening defined therein, the opening having edges that are smoothly curving and an outward-projecting upstanding flange about its perimeter.

A truck body according to the invention has a compartment defined by an inner wall, a floor, two side walls and an outer wall having an opening therein, and a door adapted to close on the opening. The door is so mounted as to be generally vertical in a closed position, is attached to the compartment by hinge means so as to rotate about a horizontal axis, and has an inner surface including a planar portion having an upstanding circumferential lip.

A truck body includes a compartment defined by an inner wall, a floor, two side walls and an outer wall having an opening therein, and a door adapted to close on the opening, the door being attached to the compartment by one ore more hinges so as to rotate about a vertical axis, the hinges being adapted to cause said door to remain in a selected open position when opened or closed slowly.

BRIEF DESCRIPTION OF THE FIGURES

FIG. 2 depicts a door for a truck body according to the invention.

FIG. 3 depicts an alternative door for a truck body according to the invention.

DETAILED DESCRIPTION OF A PREFERRED EMBODIMENT

Figure 1:
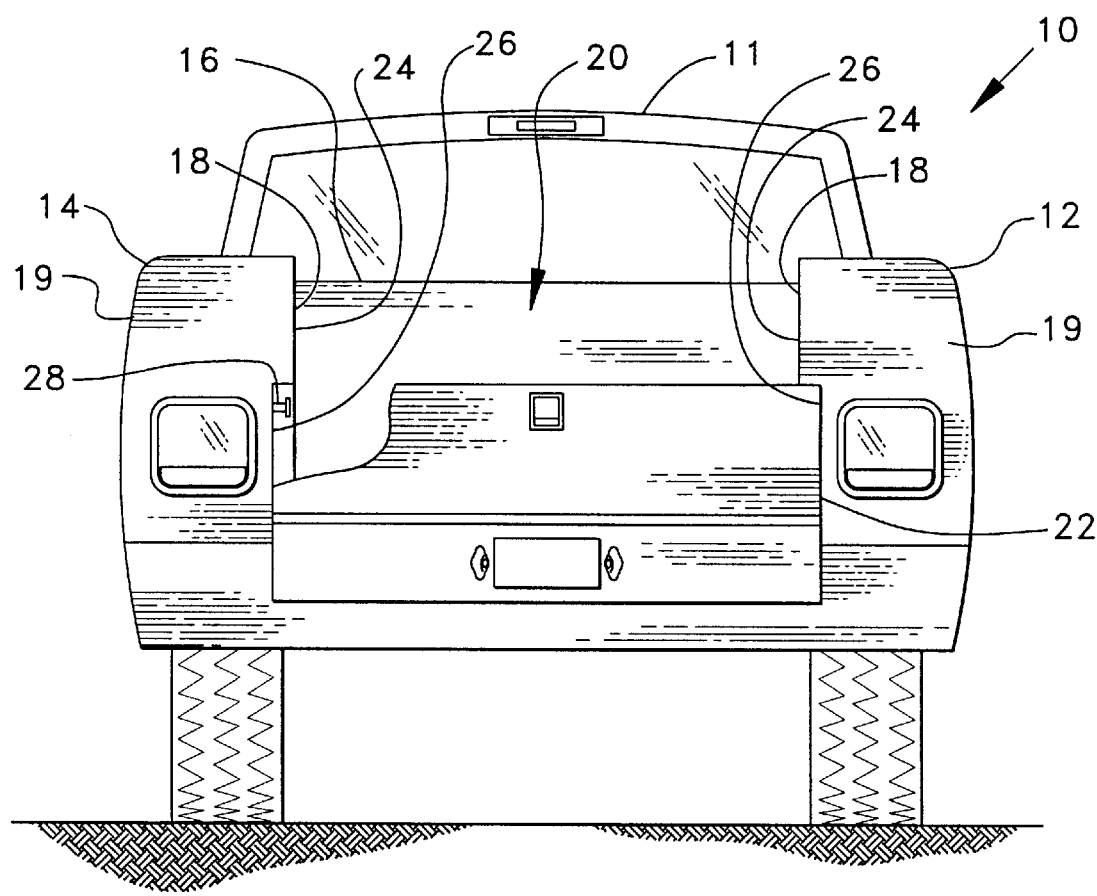
FIG. 1 depicts a truck body according to the invention.

Referring now to FIG. 1, there is depicted a truck body 10 according to the invention. Truck body 10 is conventionally mounted on the chassis of a truck 11. In this view, the cab of truck 11, and tires, which are mounted on the chassis of truck 11, are visible. Truck body 10 has two upstanding enclosures 12, 14. Enclosures 12, 14 are located at the sides of truck body 10. At the forward end of truck body 10 there is a forward wall 16. Each enclosure 12, 14 has an inner wall 18 and a rear wall 19. Central cargo area 20 is defined intermediate inner walls 18 and to the rear of forward wall 16. A horizontal cargo bed is provided in cargo area 20. Tailgate 22 is mounted at the rear of truck body 10. Tailgate 22 is shown in its upright closed position. It is rotatably mounted near the bottom thereof on each side to inner walls 18. Tailgate 22 is detachably latchable to inner walls 18 near the top of tailgate 22. Inner walls 18 have upper sections 24 and lower sections 26. Lower sections 26 are in height a small amount higher than the top of tailgate 22 when tailgate 22 is in the latched position. The width between lower sections 26 is slightly greater than the width of tailgate 22. The front to back depth of lower sections 26 is slightly greater than the thickness of tailgate 22. As a result, tailgate 22 fits easily into lower sections 26. Latch hardware 28 is mounted on lower section 26. Slam action hardware is provided, so that hardware in tailgate 22 engages latch hardware 28 when tailgate 22 is closed. The difference in width between lower section 26 and upper section 24 is sufficient that latch hardware 28 is fully recessed outward beyond the surface of upper section 24. As a result, when cargo is loaded into or removed from cargo area 20, latch hardware 28 will not ordinarily be contacted by the cargo, and thereby will not be damaged by, or scrape or otherwise damage, the cargo.

Referring now to FIGS. 2 and 3, there are shown doors 40 and 50. Doors 40 and 50 are mounted on the outer side of enclosures 12 and 14. They are mounted on hinges 52 secured to enclosures 12 and 14 respectively so as to rotate about a vertical axis. Door 40 and door 50 have identical inner panels 54. Each inner panel 54 has along both edges 56 thereof a central projecting portion 57 and recessed portions 58 both above and below projecting portion 57. Projecting portion 57 is adapted for the mounting of latch hardware 60 thereon. Specifically, projecting portion 57 provides a generally planar surface. To the interior of the planar surface, inner door panel 54 is hollow, thereby permitting the installation of lock and handle hardware interior to inner door panel 54 and physically attached to exterior latch hardware 60 through opening formed through projecting portion 57. Each recessed portion 58 is adapted for mounting of hinges 52. Each indented portion 58 is adjacent a generally planar portion 64 of inner panel 54. An opening made in recessed portion 58 permits insertion of conventional hardware for mounting of hinges, which hardware is secured on planar portion 64 of inner panel 54 by conventional fasteners 66. It will be understood that an identical inner door panel 54 may be used on all four doors of truck body 10. As door panels 54 are preferably die molded, the use of uniform door panels 54 minimizes the number of molds required in manufacture of the doors.

Figure 4:
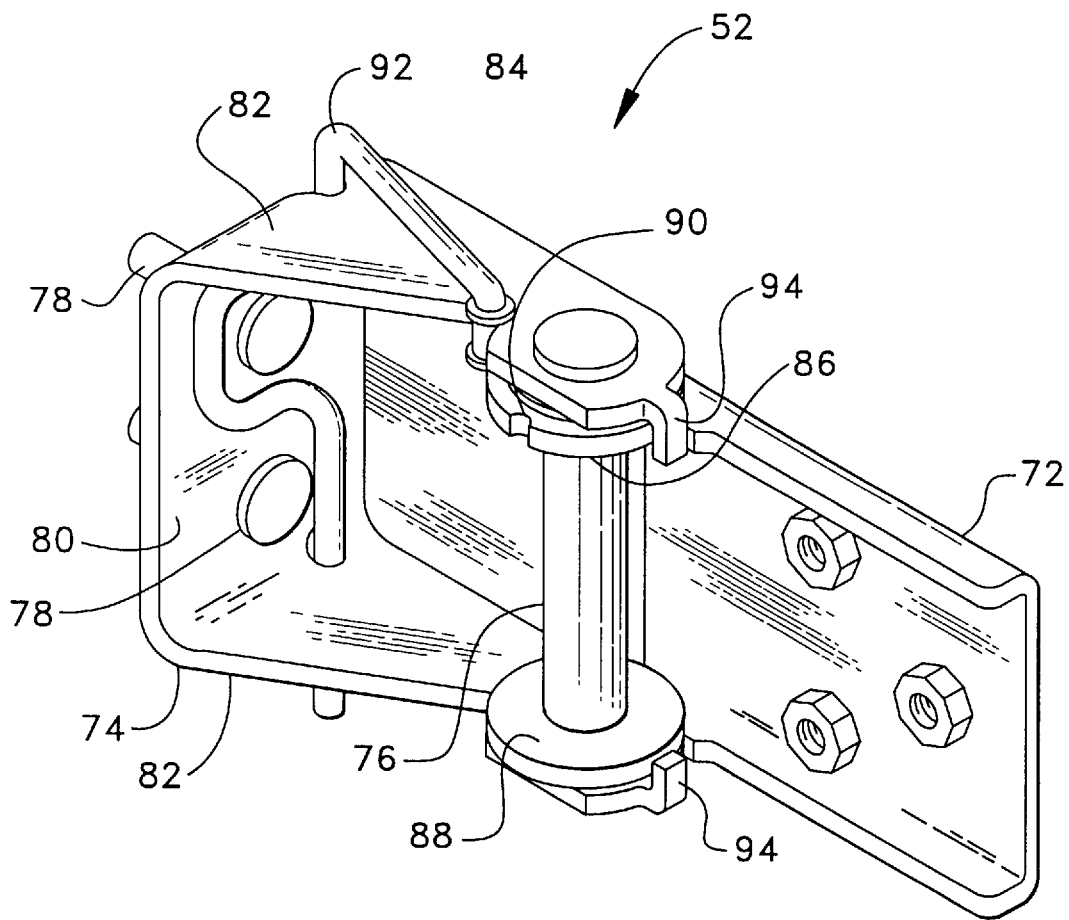
FIG. 4 depicts a hinge mechanism for use in mounting a door on a truck body.

Referring now to FIG. 4, there is shown in detail hinge 52 according to the invention. Hinge 52 has door section 72, and body section 74, which are rotatably attached together by rod 76. Door section 72 is adapted to be mounted on inner panels 54 of the doors, as discussed above. Body section 74 is adapted to be mounted on the truck body by fasteners 78.

Door section 78 includes generally planar center portion 80, in which fasteners 78 are mounted, and side portions 82. Each side portion 82 is rotatably mounted on rod 76 remote from end portion 80. Each side portion 82 has a recess 84. Body section 72 has first flange 86 and second flange 88 extending therefrom mounted on rod 76. First flange 86 has indent 90 along one edge thereof. Tension rod 92 extends along center portion 80 of door section 78, through both side portions 82, and curves to lie on side portion 82 to end in a tip extending into recess 84 of side portion 82. Stop tabs 94 extend from side portions 82 and curve around flanges 86, 88 of door section 72. Hinge 52 is shown in the fully-open position. When the door is slowly closed, the end of tension rod 92 will engage with recess 90 in flange 86. The door will therefore remain in a selected partially-open position unless a force is exerted to close the door or open it further. This feature is convenient for permitting easy access to the interior of the truck body.

Figure 5:
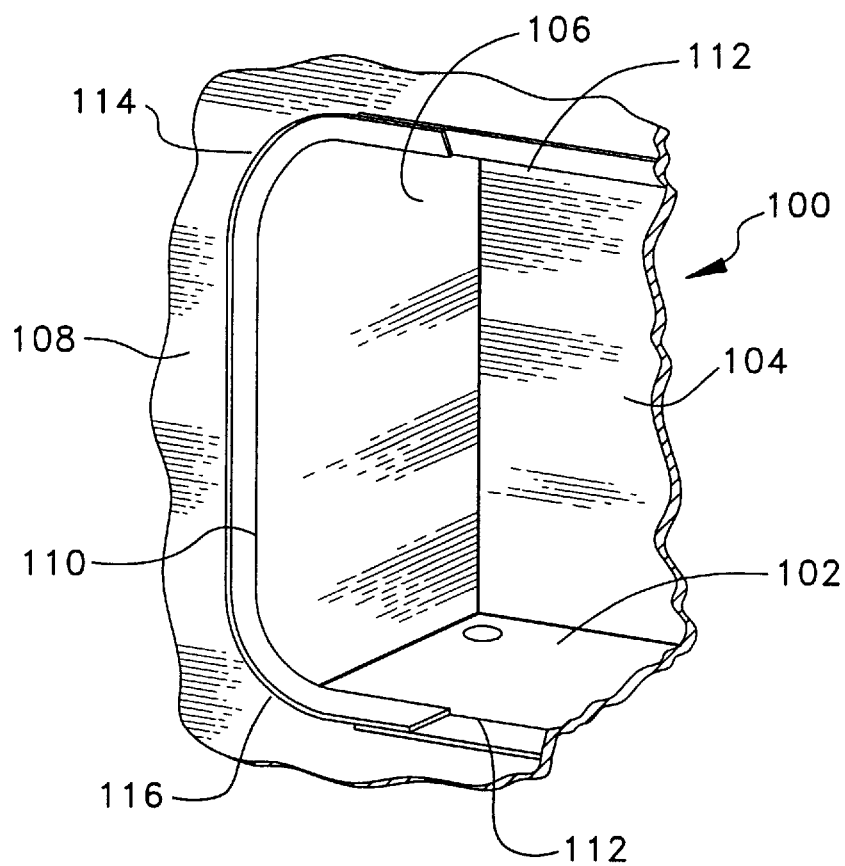
FIG. 5 is a partial cutaway of a truck body according to the invention.

Referring now to FIG. 5, there is shown a partial isometric view of a compartment 100 in a truck body according to the invention. Compartment 100 is defined by a horizontal planar floor 102, a substantially planar vertical rear wall 104 joined at a lower edge thereof to an inner edge of floor 102, and a substantially planar vertical side wall 106, perpendicular to rear wall 104. Side wall 106 is joined along an inner edge thereof to rear wall 104. Exterior wall 108 is generally vertical. Exterior wall 108 is joined to a front edge of floor 102 and a front edge of side wall 106. It will be understood that similar side walls 106 are provided on an opposite side of compartment 106.

Front wall 106 has opening 108 defined therein. Opening 106 has generally straight sides at 110 and 112, and is smoothly curved at corners 114 and 116. Front wall 106 is turned outward to define an outward-projecting flange 118 about the entire circumference of opening 108. The curving nature of corners 114, 116 and the presence of flange 118, greatly strengthens compartment 100, particularly at joints among various walls.

Figure 6:
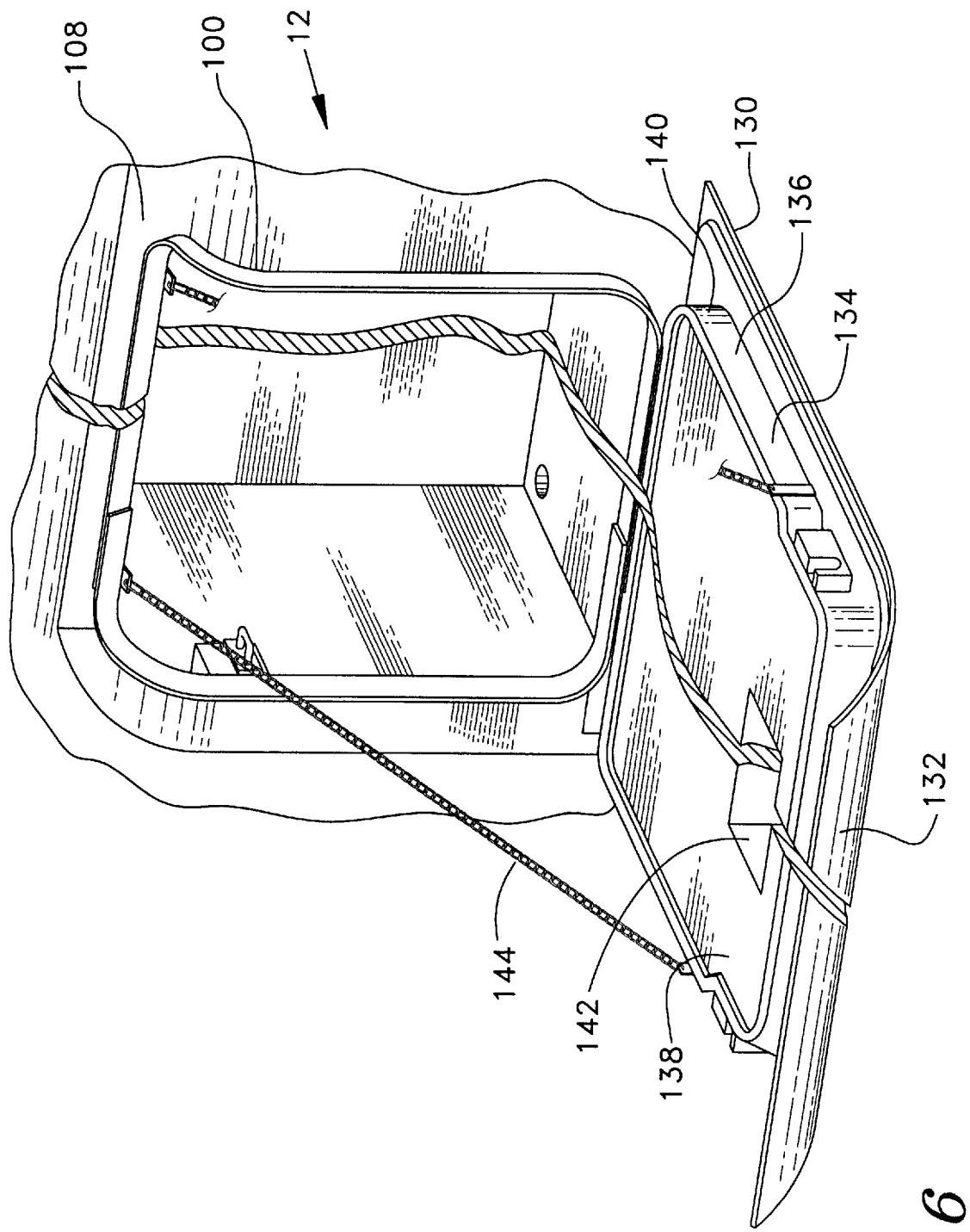
FIG. 6 is a partial cutaway of a truck body according to the invention.

Referring now to FIG. 6, there is shown a partial, broken isometric view of compartment 100 with door 130 hingedly attached thereon. Door 130 is a center door on an enclosure 12 of a truck body 10. Door 130 is hingedly attached at the bottom thereof to enclosure 12. Door 130 has a curving outer panel 132 and inner panel 134. Inner panel 134 has a raised center section 136 having planar surface 138 and raised circumferential lip 140. Opening 142 in planar surface 138 is substantially rectangular, although it may have other forms. Flexible cables 144 are fastened at one end thereof to enclosure 12, and specifically to the interior of front wall 108 of compartment 100, and at its opposite end to door 130. The length of cables 144 is so selected as to cause surface 138 to be substantially horizontal when door 130 is open and cables 144 are supporting door 130. As a result, surface 138 provides a convenient work surface, with a retaining lip 140 to prevent screws, nails and other small items from rolling or sliding off. Appropriate cups may be placed in opening 142 to provide a convenient location for temporary storage of small items while the door is open.

It will be appreciated that there are considerable variations that can be accomplished in an article according to the invention without departing from its scope. As a result, although a preferred embodiment of an article of the invention has been described above, it is emphasized that the invention is not limited to a preferred embodiment and there exists other alternative embodiments that are fully encompassed within the invention's scope, which is intended to be limited only by the scope of the appended claims.

What is claimed is:

1. A truck body, comprising:

(a) enclosures on each side of said truck body, each of said enclosures having an inner wall, a forward wall, and a rear wall;

(b) a central forward wall joining said enclosure forward walls;

(c) a central cargo area intermediate said inner walls and said central forward wall, having a horizontal cargo bed; and (d) a tailgate at the rear of said cargo area, said tailgate being generally rectangular and upright in a closed position, rotatably mounted on each side thereof near the bottom thereof to said inner walls, and detachably latchable near the top thereof to said inner walls;

wherein said inner walls have upper and lower sections, the horizontal distance between opposite portions of said upper sections being less than the horizontal distance between opposite portions of said lower sections; and wherein said tailgate is latchable to said lower sections of said inner walls.

2. The truck body of claim 1, further comprising latch hardware mounted on each of said inner wall lower sections.

3. The truck body of claim 2, further comprising means interior to said tailgate for engaging said latch hardware.

* * * * *